United States Patent

Saito et al.

[19]

[11] Patent Number: 6,002,819
[45] Date of Patent: Dec. 14, 1999

[54] OPTICAL SWITCH AND SWITCHING METHOD

[75] Inventors: Kazuhito Saito; Takeo Komiya; Mitsuaki Tamura; Kazumasa Ozawa, all of Yokohama; Kenichi Tomita, Kashiwa; Naoki Nakao, Chiba; Masato Kuroiwa, Edogawa-ku, all of Japan

[73] Assignees: Sumitomo Electric Industries, Ltd., Osaka; Nippon Telegraph and Telephone Corporation, Tokyo, both of Japan

[21] Appl. No.: 08/975,056

[22] Filed: Nov. 20, 1997

[30] Foreign Application Priority Data

Nov. 21, 1996 [JP] Japan .................................. 8-310863
Jan. 31, 1997 [JP] Japan .................................. 9-018272

[51] Int. Cl.[6] ........................................................ G02B 6/26
[52] U.S. Cl. .................................. 385/22; 385/38; 385/83
[58] Field of Search ................................ 385/16–23, 25, 385/73, 38, 65, 59, 83

[56] References Cited

U.S. PATENT DOCUMENTS

| | | | |
|---|---|---|---|
| 5,418,872 | 5/1995 | Osaka et al. | 385/16 |
| 5,446,810 | 8/1995 | Watanabe et al. | 385/22 |
| 5,483,608 | 1/1996 | Yokomachi et al. | 385/22 |
| 5,590,227 | 12/1996 | Osaka et al. | 385/16 |

FOREIGN PATENT DOCUMENTS

| | | |
|---|---|---|
| 0 640 857 A1 | 3/1995 | European Pat. Off. . |
| 0 677 763 A1 | 10/1995 | European Pat. Off. . |
| 0 686 861 A1 | 12/1995 | European Pat. Off. . |
| 2-306212 | 12/1990 | Japan . |
| 6-67101 | 3/1994 | Japan . |
| 08227045 | 9/1996 | Japan . |

OTHER PUBLICATIONS

Patent Abstracts of Japan, vol. 012, No. 271 (P–736), Jul. 28, 1988 & JP 63 053503 A (Fujitsu Ltd), Mar. 1988.

*Primary Examiner*—Hung N. Ngo
*Attorney, Agent, or Firm*—Pillsbury Madison & Sutro LLP

[57] ABSTRACT

An optical switch 1 of the present invention comprises an optical fiber arraying member 21 for keeping a plurality of first optical fibers 20 juxtaposed with tip portions thereof being aligned, a movable arm 31, opposed to the optical fiber arraying member, for holding a tip portion of at least one second optical fiber 30, a driving mechanism 40 for driving this movable arm 31 to selectively optically coupling the second optical fiber 30 with an arbitrary first optical fiber 20, a supplying mechanism 60 for, when a first optical fiber 20 is optically coupled with the second optical fiber, dropping and charging an index matching agent to a gap between these optical fibers 20, 30, and drop controllers 67, 68 for controlling the supplying mechanism 60, wherein the index matching agent is dropped and charged into only the gap between the optical fibers, so that foreign matter produced in the driving mechanism 40 or the like is prevented from intruding into the coupling part between the optical fibers 20, 30, thus assuring stable optical characteristics.

31 Claims, 8 Drawing Sheets

OPTICAL SWITCH AND SWITCHING METHOD

BACKGROUND OF THE INVENTION

1. Field of the Invention

The present invention relates to an optical switch and a switching method thereof for switching of optical transmission lines consisting of optical fibers, for example, in the field of optical communication.

2. Related Background Art

An example of such optical switch known heretofore is the apparatus of the type disclosed in the bulletin of Japanese Laid-open Patent Application No. Hei 6-67101. This optical switch has a first optical fiber group composed of a number of first optical fibers, an optical fiber arraying member for arraying the first optical fiber group horizontally, a second optical fiber, an optical fiber driving mechanism for holding this second optical fiber and mechanically moving the second optical fiber to optically couple the second optical fiber with an arbitrary first optical fiber, and a sealing case for housing the first optical fiber group, second optical fiber, optical fiber arraying member, and optical fiber driving mechanism. The sealing case is filled with an index matching agent having an index of refraction nearly equal to that of the first optical fibers and second optical fiber, such as silicone oil. Therefore, the index matching agent is interposed in a gap between connected end faces of the first optical fiber and second optical fiber, which decreases optical losses due to scattering or the like in this gap, which prevents optical loss build up due to switching of the first optical fiber and second optical fiber, and which stabilizes optical characteristics.

This conventional, optical switch, however, had the following problems because of the above-stated structure.

Specifically, since the optical switch was constructed in the structure wherein the optical fiber driving mechanism was immersed in the index matching agent, foreign matter such as wear powder produced by mechanical contact or abrasion of the optical fiber driving mechanism flowed into the index matching agent filling the case and moved therein to intrude into the coupling part between the optical fibers, which resulted in degrading the optical characteristics of optical switch. Since the silicone oil used as an index matching agent is likely to leak even through a fine hole, the oil seal structure was complex in the sealing case (taking countermeasures against leakage, countermeasures during the assembling step, etc.).

An object of the present invention is to provide an optical switch that is unlikely to experience the deterioration of optical characteristics due to intrusion of foreign matter into the coupling part between optical fibers and that requires no complex seal structure, solving the above problems.

SUMMARY OF THE INVENTION

In order to achieve the above object, an optical switch of the present invention is an optical switch comprising a first optical fiber group comprised of a plurality of optical fibers tip portions of which are aligned and fixed, a movable, second optical fiber an end face of which is located opposite to an end face of the first optical fiber group, and a driving mechanism for moving the second optical fiber to a position where the second optical fiber is located opposite to an arbitrary first optical fiber in the first optical fiber group, the optical switch being arranged to selectively switch optical coupling between the arbitrary first optical fiber and the second optical fiber, the optical switch comprising a matching portion of an index matching agent having an index of refraction substantially equal to that of the optical fibers, in a gap portion between coupled end faces of the first optical fiber and second optical fiber, and a supplying mechanism for supplying the index matching agent to the gap portion.

Namely, the present invention provides the optical switch that undergoes switching of optical transmission line by moving the second optical fiber by the driving mechanism so as to make the end face of the second optical fiber opposed to the end face of the arbitrary first optical fiber in the first optical fiber group, thereby optically coupling them with each other. The supplying mechanism supplies the index matching agent to this coupling part, thereby forming the matching portion. This prevents scattering and reflection in the coupling part, thus stabilizing the optical characteristics. Since the index matching agent is supplied to only the gap of the coupling part, there is no need to immerse the driving mechanism etc. in the index matching agent, a supply amount of the matching agent is small, and the foreign matter such as wear powder produced in the driving mechanism can be prevented from flowing into the coupling part.

A variety of methods can be contemplated for the supply of the index matching agent to the coupling part, and practically applicable methods are the following methods, which are stated in the claims of the present application.

For example, the first optical fiber group is fixed on a substrate in which a linear groove of a predetermined width is provided, and the end face thereof is aligned with an edge of the groove. The supplying mechanism pours a predetermined amount of the index matching agent into this groove, thereby supplying the index matching agent into the gap portion through this groove.

In this apparatus, the index matching agent charged in the groove seeps into the gap of the coupling part from the liquid level of index matching agent in the groove because of the action such as so-called wetting or capillarity resulting from affinity between molecules of the index matching agent and the connecting member or the end face portions of optical fiber, and is held therein, thereby forming the matching portion described above.

In another arrangement, the supplying mechanism may further comprise drop charging means having a drop nozzle for drop-charging a droplet of the index matching agent onto the end face of the second optical fiber.

This drop nozzle may be fixed so as to face an end face of a first optical fiber at a predetermined position in the first optical fiber group.

In this case, the optical switch is preferably arranged to further comprise a control mechanism for controlling the supplying mechanism to supply the index matching agent when the second optical fiber is optically coupled with the first optical fiber at the predetermined position.

In this arrangement the matching agent is supplied to the gap portion by dropping the index matching agent from the drop nozzle fixed so as to face the end face of the first optical fiber when the second optical fiber is optically coupled with the first optical fiber at the predetermined position. The matching agent supplied in this way is held in the gap portion by surface tension or the like to form a matching layer. When the second optical fiber is moved thereafter, the second optical fiber moves while keeping a certain amount of the matching agent on the end face. Owing to this, when the second optical fiber is coupled with another first optical fiber at a different position, the matching layer is also formed in the gap by the matching agent thus kept. Further, if the end face of the first optical fiber group is also preliminarily made wet by the matching agent, that is, if a fixed amount of the matching agent is held on the end face, the matching layer can be formed for certain. This can be realized by depositing the matching agent through the second optical fiber.

Another permissible arrangement is such that the drop nozzle, together with the second optical fiber, is driven by the driving mechanism, so that it is always kept opposite to the end face of the second optical fiber.

In this case, since the drop nozzle is always directed to the coupling part, the index matching agent can be supplied surely to the gap of the coupling part, thereby forming the matching layer.

Since in this case the matching agent is also held on the end face of each optical fiber, there is no need to supply the matching agent every switching.

Another arrangement may be constructed in such a way that the supplying mechanism is located on an extension line along an array direction of the first optical fiber group and that the optical switch further comprises a control mechanism for moving the tip portion of the second optical fiber to the supplying mechanism by controlling the driving mechanism.

This arrangement permits the matching agent to be deposited on the end face of the second optical fiber by moving the tip portion thereof to the supplying mechanism. When the second optical fiber with the matching agent held on the end face thereof in this way is optically coupled with an arbitrary first optical fiber, the matching agent is held in the gap of the coupling part between them, thereby forming the matching portion.

In either of these cases, the matching layer is formed in the coupling part between the second optical fiber and the first optical fiber when the second optical fiber is optically coupled with any first optical fiber by switching, whereby the optical characteristics can be stabilized with suppressing the optical losses.

A further preferred arrangement is such that the supplying mechanism or the like is controlled at a preset time to supply a set amount of the index matching agent.

In the present invention the index matching agent is held mainly on the end face of optical fiber. Accordingly, different from the case wherein the entire apparatus is immersed in the index matching agent as in the conventional apparatus, there is a possibility that the index matching agent held decreases because of evaporation or the like. Since the optical switches are usually used under controlled circumstances such as communication facilities, evaporation amounts can be estimated accurately to some extent. Therefore, evaporation of the matching layer can be compensated for by calculating a supply amount necessary for compensation for an evaporation amount and supplying the index matching agent, based thereon.

By a further arrangement wherein cleaning for washing the end faces with the matching agent is carried out at constant time intervals, even if floating particles or the like are mixed in the matching layer, influence thereof can be eliminated.

In another arrangement, the optical switch may further comprise photodetecting means for measuring a loss of transmitted light in the first and second optical fibers optically coupled with each other, and a control mechanism for, when the loss of transmitted light detected by the photodetecting means becomes over a predetermined quantity, controlling the supplying mechanism or the like to supply the index matching agent before the loss of transmitted light becomes not more than the predetermined quantity.

The evaporation of the matching agent held in the is gap of the coupling part and the mixture of foreign matter into the gap increases optical losses in the coupling part. Accordingly, an increase in the loss of transmitted light in the coupling part means occurrence of either one of the evaporation of matching agent and the mixture of foreign matter. In the case of the evaporation of matching agent, the matching agent needs to be added; in the case of the mixture of foreign matter, it needs to be removed by cleaning or the like. By employing the above-stated structure, when the loss of transmitted light increases because of the evaporation of matching agent or the mixture of foreign matter, the matching agent is supplied before the loss of transmitted light is lowered. This means that in the case of the evaporation of matching agent, the matching agent is added until the amount of matching agent in the matching layer becomes sufficient or that in the case of the mixture of foreign matter, the matching agent is continuously supplied until the foreign matter is removed, that is, until the foreign matter is washed away by the matching agent. As a result, the loss of transmitted light of the optical switch is always kept below the predetermined quantity.

In another arrangement, the optical switch may be arranged in such a manner that a set amount of the index matching agent is supplied based on an operation of an operator. In this case the loss of transmitted light of the optical switch can also be suppressed.

In these apparatus, the supplying mechanism may further comprise a tank for reserving the index matching agent, a pump for taking a predetermined amount of the index matching agent out of the tank, a filter device for filtering the index matching agent taken out by the pump, and a supply tube for supplying the index matching agent thus filtered to the groove or the drop nozzle or the like.

This arrangement enables to readily supply a predetermined amount of clean index matching agent without mixture of foreign matter as filtered by the filter device. It is also easy to add or replace the index matching agent.

Further, the present invention also involves optical switching methods according to the above-stated configurations.

These optical switching methods enable high-speed optical switching as maintaining stable optical characteristics.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Embodiments of the present invention will be described in detail with reference to the accompanying drawings. In the description of the drawings and the description with reference to the drawings, the same elements will be denoted by the same reference symbols and redundant description will be omitted.

(First Embodiment)

Figure 1:
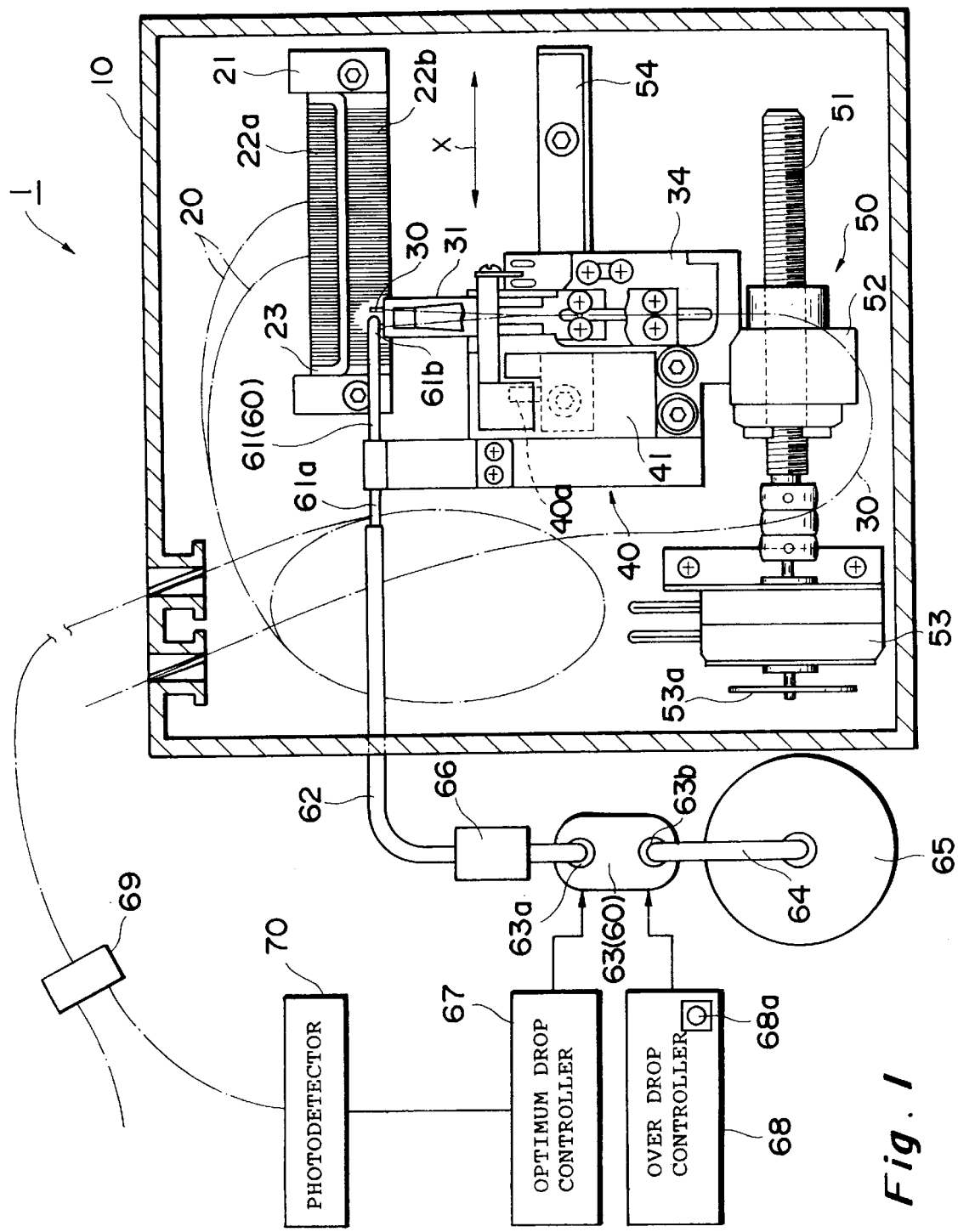
FIG. 1 is a cross-sectional view to show an optical switch as a first embodiment of the present invention.
Figure 2:
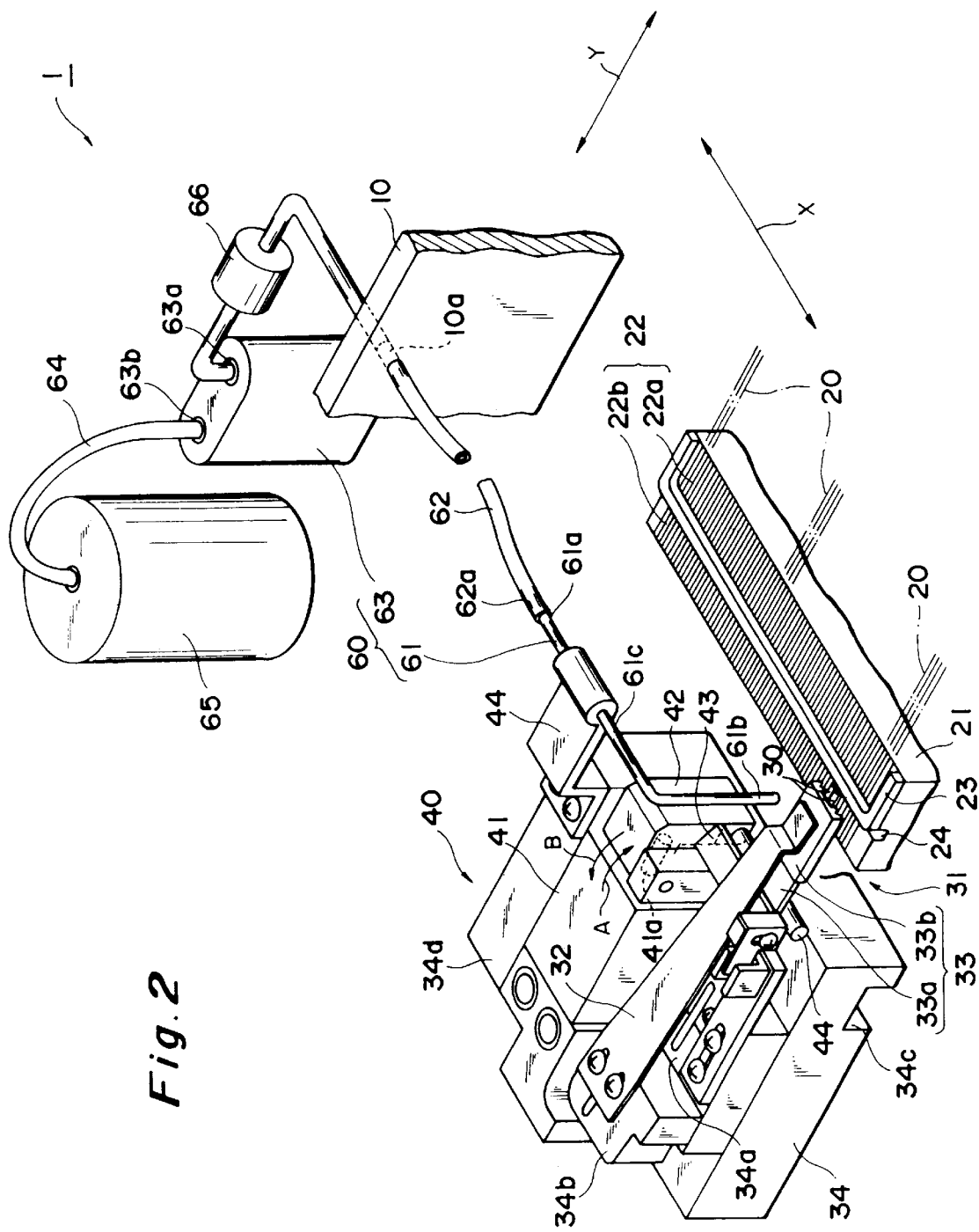
FIG. 2 is a perspective view to show the major part of the optical switch shown in FIG. 1.
Figure 3:
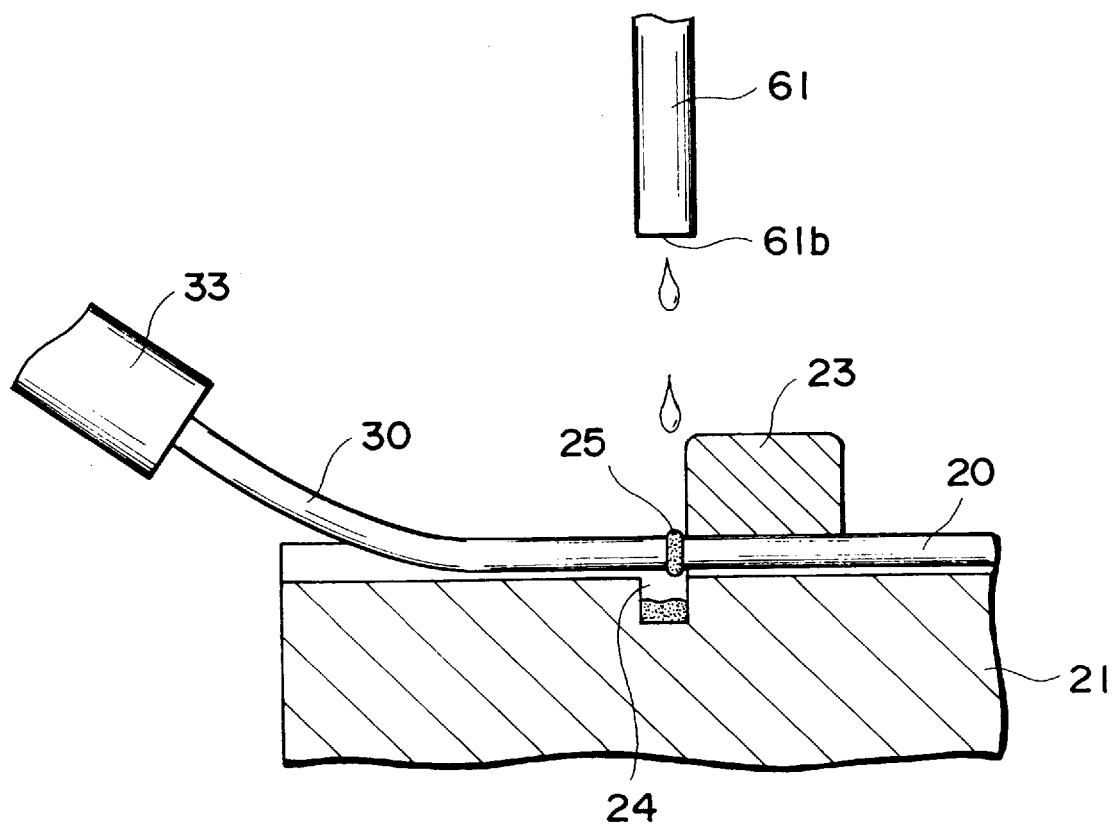
FIG. 3 is a cross-sectional view to show an optically coupled state between the first optical fiber and the second optical fiber in the optical switch shown in FIG. 1.

FIG. 1 is a cross-sectional view to show optical switch 1, which is the first embodiment of the present invention. FIG. 2 is a perspective view of the major part thereof and FIG. 3 is a cross-sectional view of the coupling part between optical fibers.

As shown in FIG. 1, the optical switch 1 is sealed in sealing case 10 of a rectangular parallelepiped. Provided in one end portion inside this sealing case 10 is optical fiber arraying member 21 of a block shape for fixing a plurality of first optical fibers (for example, eighty eight fibers) 20 as aligning the tip portions thereof. Movable arm 31 holding tip portions of a plurality of second optical fibers (two fibers) 30 is located opposite to the optical fiber arraying member 21 in the central portion of sealing case 10. This movable arm 31 is attached to movable arm driving mechanism 40 for vertically driving the movable arm 31. Further provided in the other end portion of the sealing case 10 is coupling position selecting mechanism 50 for driving the movable arm 31 along the array direction (the X-direction) of the first optical fibers 20. The diameter of each optical fiber 20, 30 is 125 μm.

Fixed to the movable arm driving mechanism 40 is a drop nozzle 61 for dropping droplets of the index matching agent one by one toward the gap between the first optical fiber 20 and the second optical fiber 30 optically coupled. This index matching agent is one having an index of refraction almost equal to that of the core layer of optical fiber, which is preferably silicone oil, for example. Since the index matching agent needs to spread on the end face after dropped, those with too high viscosity are not preferred. Especially, when the viscosity is over 100 cP, the liquid becomes easy to involve bubbles of air, and optical scattering due to the bubbles becomes a cause of splicing loss. Accordingly, suitable index matching agents are those with the viscosity not more than 100 cP. On the other hand, if the viscosity is below 5 cP, the surface tension will become too low, so as to thin the thickness of the liquid layer or liquid droplet formed on the end face of optical fiber, which makes it difficult to form the index matching layer in the gap of the coupling part. Therefore, preferred index matching agents are those with the viscosity not less than 5 cP. Therefore, the present embodiment employs the index matching agent having the viscosity of 50 cP. The index matching agent dropped in this way adheres to the end face of first optical fiber 20 and to the end face of second optical fiber 30 by surface tension (see FIG. 3). The index matching agent adhering to both end faces fills the gap between the first optical fiber 20 and the second optical fiber 30, thus forming the matching layer 25. Existence of the matching layer 25 formed in this way suppresses reflection of signal light at the end faces of the first optical fiber 20 and second optical fiber 30. Namely, it can prevent reduction of optical transmission efficiency between the first optical fiber 20 and the second optical fiber 30.

Polytetrafluoroethylene (e.g., Teflon)-based tube 62 having flexibility is connected to base end 61a of the drop nozzle 61. The tube 62 penetrates the sealing case 10 to extend to the outside thereof and the extending tube 62 is connected to feed outlet 63a of supply pump 63 disposed outside of the sealing case 10. Connected to inlet 63b of supply pump 63 is polytetrafluoroethylene (e.g., Teflon)-based tube 64 extending from matching agent tank 65 for reserving the index matching agent. Therefore, when the supply pump 63 is driven, the index matching agent reserved in the matching agent tank 65 is fed through the inside of tubes 64, 62 to the drop nozzle 61 and is then dropped from the tip 61b of the drop nozzle 61. Further, filter 66 for filtering impurities off from the index matching agent is attached to the tube 62 between the drop nozzle 61 and the supply pump 63. The filter 66 has meshes of 1 μm, which can remove almost all impurities from the index matching agent. Therefore, the index matching agent cleaned is always supplied to the drop nozzle 61. In this embodiment the supply pump 63 is a diaphragm type solenoid-operated pump, but it may be a rotary type pump. These elements from the matching agent tank 65 to the drop nozzle 61 constitute the supplying mechanism 60.

The drive of the supply pump 63 is controlled by optimum drop controller 67 and over drop controller 68. The optimum drop controller 67 detects the optical transmission efficiency of the first optical fiber 20 by photodetector 70 through coupler 69 and controls the supply pump 63, based on a signal indicating the optical transmission efficiency, supplied from the photodetector 70. More specifically, when the optical transmission efficiency detected by the photodetector 70 shows a drop, the optimum drop controller 67 judges that the index matching agent decreased in the gap between the first optical fiber 20 and the second optical fiber 30 and then drives the supply pump 63 to replenish the gap with an optimum amount of the index matching agent. The over drop controller 68 is arranged in such a manner that when the operator turns switch 68a on, the controller 68 drives the supply pump 63 to feed an excessive amount of index matching agent, greater than the "optimum amount" described above, into the gap between the first optical fiber 20 and the second optical fiber 30.

As shown in FIG. 2, on the top surface of the optical fiber arraying member 21 there are a predetermined number of V-grooves 22 of the same shape extending linearly in the optical fiber coupling direction (in the Y-direction) and arranged at equal intervals in the X-direction. The pitch and depth of these V-grooves 22 are 0.25 mm and 0.17 mm, respectively. One side of each V-groove 22 is used as first optical fiber fixing groove 22a for fixing each of the eighty eight first optical fibers 20 with an adhesive, while the other side of each V-groove 22 is used as second optical fiber introducing groove 22b for guiding the second optical fiber 30 fixed to the movable arm 31 thereinto. U-shaped cover plate 23 is attached onto the first optical fiber fixing grooves 22a and the first optical fibers 20 are fixed for certain in the first optical fiber fixing grooves 22a by pushing this cover plate 23 from the top.

Matching agent drain groove 24 is formed in the top surface of the optical fiber arraying member 21 and below the coupling part between the first optical fiber 20 and the second optical fiber 30. The matching agent drain groove 24 extends in the array direction (the X-direction) of the first optical fibers 20. The width of this drain groove 24 is 0.2 mm and the depth thereof is 0.5 mm. This drain groove 24 can drain an excessive amount of the matching agent not contributing to formation of the matching layer 25, out of the index matching agent dropped from the drop nozzle 61, to the outside of the optical fiber arraying member 21. This prevents the index matching agent from staying on the top surface of the optical fiber arraying member 21, thereby preventing dust (foreign matter) on the top surface of the optical fiber arraying member 21 from mixing into the index matching agent filling the gap between the first optical fiber 20 and the second optical fiber 30. This prevents degradation of the optical characteristics of optical switch 1 due to the influence of dust adhering to the top surface of the optical fiber arraying member 21.

This drain groove 24 is further utilized in order to align the end faces of the first optical fibers 20. The plurality of first optical fibers 20 are fixed by the cover plate 23 so that the tip portions thereof project above this drain groove 24. Then these first optical fibers 20 are cut in parallel with the side face of cover plate 23 and the side face of the drain groove 24, thereby aligning the end faces of these fibers. This method can facilitate alignment of positions of the respective end faces.

Next described are the movable arm 31 and movable arm driving mechanism 40 disposed in the central portion of the sealing case 10. As shown in FIG. 2, the movable arm 31 is composed of first movable arm 32 of a plate shape located outside and having the spring property, and second movable arm 33 located inside and having the spring property. The base end of this first movable arm 32 is fixed by screws or the like to top surface 34a located in a lower step of block-shaped base 34 and the base end of the second movable arm 33 is fixed by screws or the like to top surface 34b located in a middle step of base 34.

Spring portion 33a of a single spring plate is provided in the center of the second movable arm 33. This spring portion 33a urges the second movable arm 33 downward in the steady state and allows displacement thereof to the side in order to compensate for positional deviation occurring when the second optical fiber 30 is introduced into the V-groove 22. Further, block-shaped movable head 33b is fixed in the tip portion of the second movable arm 33 and two second optical fibers 30 are fixed to the movable head 33b so as to be opposed to the V-grooves 22 of the optical fiber arraying member 21. The first movable arm 32 is also made of a spring plate and is urged downward in the steady state.

The movable arm driving mechanism 40 is disposed beside of the above-stated movable arm 31. This movable arm driving mechanism 40 is composed of electromagnetic solenoid 41 fixed to the base 34, L-shaped swing portion 42 arranged to swing when pushed by plunger 41a of the electromagnetic solenoid 41, first operation bar 43 extending in the X-direction from an inner side face of the swing portion 42 and disposed between the first movable arm 32 and the second movable arm 33, for pushing the first movable arm 32 upward, and second operation bar 44 extending in the X-direction from the inner side face of the swing portion 42 and disposed inside of the second movable arm 33, for pushing the second movable arm 33 upward.

When the movable arm 31 is in the steady state (in a V-contact state wherein the second optical fibers 30 are set in the V-grooves 22 of the optical fiber arraying member 21), the plunger 41a is retracted, and the swing portion 42 is rotated in the direction of arrow A by urging force of a coil spring (not illustrated) stretched between the base 34 and the swing portion 42, thereby disengaging the first movable arm 32 from the first operation bar 43 and disengaging the second movable arm 33 from the second operation bar 44. As a result, the tip portion of the second movable arm 33 is pushed by the tip portion of the first movable arm 32, whereby the second optical fibers 30 go into the V-contact with the optical fiber arraying member 21.

When the movable arm 31 is moved in the X-direction for switching of optical coupling, the plunger 41a is moved forward in order to release the V-contact state of the second optical fibers 30. As the swing portion 42 is pushed by this plunger 41a, the swing portion 42 is rotated in the direction of arrow B. As a result, the V-contact state of the second optical fibers 30 is released as pushing the first movable arm 32 upward by the first operation bar 43 and pushing the second movable arm 33 upward by the second operation bar 44.

Next described is the coupling position selecting mechanism 50 disposed in the other end portion of the sealing case 10. As shown in FIG. 1, this coupling position selecting mechanism 50 has screw shaft 51 extending in the X-direction in the sealing case 10, female screw portion 52 fixed to the base 34 and coupled with the screw shaft 51, step motor 53 with encoder 53a for driving the screw shaft 51, and guide rail 54 for guiding movement of the base 34. The guide rail 54 is fixed in the sealing case 10 and extends in the X-direction. Slide recess 34c formed in the bottom surface of the base 34 is arranged to slide along this guide rail 54, which enables stable X-directional movement of the base 34.

Next described is the drop nozzle 61 for dropping the index matching agent into the gap between the first optical fiber 20 and the second optical fiber 30. As shown in FIG. 2, base portion 61c of the drop nozzle 61 is fixed to the tip of fixture 44 fixed to the top surface 34d in an upper step of base 34. The base portion 61c of the drop nozzle 61 extends in the X-direction and then is bent midway so that tip portion 61b thereof extends downward. As a result, the tip portion 61b of the drop nozzle 61 is positioned in the vicinity of the tip portion of second optical fiber 30.

One end 62a of tube 62 having flexibility is connected to the base end 61a of the drop nozzle 61 and the other end 62b of the tube 62 extends to the outside through tube exit hole 10a formed in the sealing case 10. Here, the tube 62 between the tube exit hole 10a and the drop nozzle 61 is provided with slack enough for the drop nozzle 61 to slide in the X-direction along with the base 34. Therefore, even when the base 34 slides away from the tube exit hole 10a, the tube 62 is prevented from slipping off the drop nozzle 61 as being pulled by the drop nozzle 61.

Next described is the operation of optical switch 1 of the present embodiment. First, when the supply pump 63 is driven in the V-contact state of the second optical fibers 30 with the optical fiber arraying member 21, the index matching agent is sucked up from the matching agent tank 65 to be fed into the tube 62. The index matching agent is fed through the inside of tube 62 to the drop nozzle 61 and then the index matching agent is dropped from the tip 61b of the drop nozzle 61 as shown in FIG. 3. A part of the index matching agent thus dropped adheres to the end face of the first optical fiber 20 and to the end face of the second optical fiber 30 by surface tension to be charged in the gap between the first optical fiber 20 and the second optical fiber 30. The excessive index matching agent not adhering to these end faces flows down into the matching agent drain groove 24.

Since the drop nozzle 61 supplies drops of the index matching agent one by one into the gap between the first optical fiber 20 and the second optical fiber 30 in this way, the gap can be filled with an irreducible minimum amount of the index matching agent. Since the index matching agent is charged in the gap between the first optical fiber 20 and the second optical fiber 30 without immersing the movable arm driving mechanism 40 in the index matching agent, the dust such as wear powder produced in the movable arm driving mechanism 40 is prevented from mixing into the index matching agent charged in the gap between the first optical fiber 20 and the second optical fiber 30. This can prevent degradation of the optical characteristics of optical switch 1 due to the influence of the dust produced in the movable arm driving mechanism 40. Further, the oil seal structure can be simple in the sealing case 10, because the amount of the index matching agent used is small.

Figure 4:
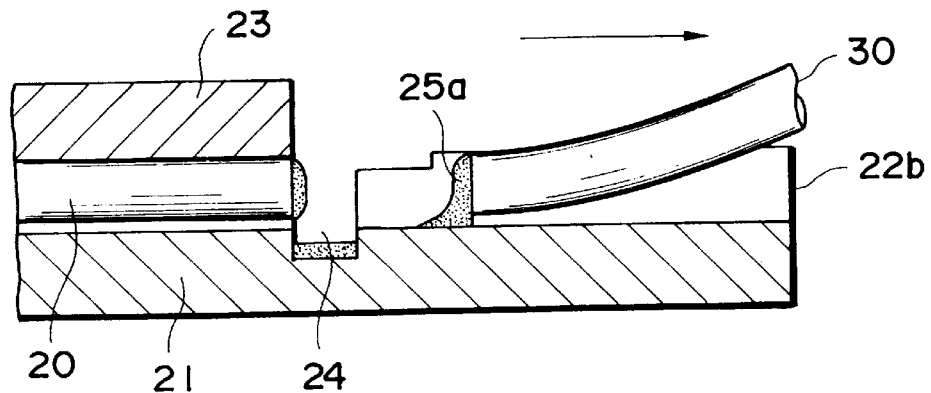
FIG. 4 to FIG. 6 are cross-sectional views for explaining positional relations between the first optical fiber and the second optical fiber upon switching of the optical switch shown in FIG. 1.
Figure 5:
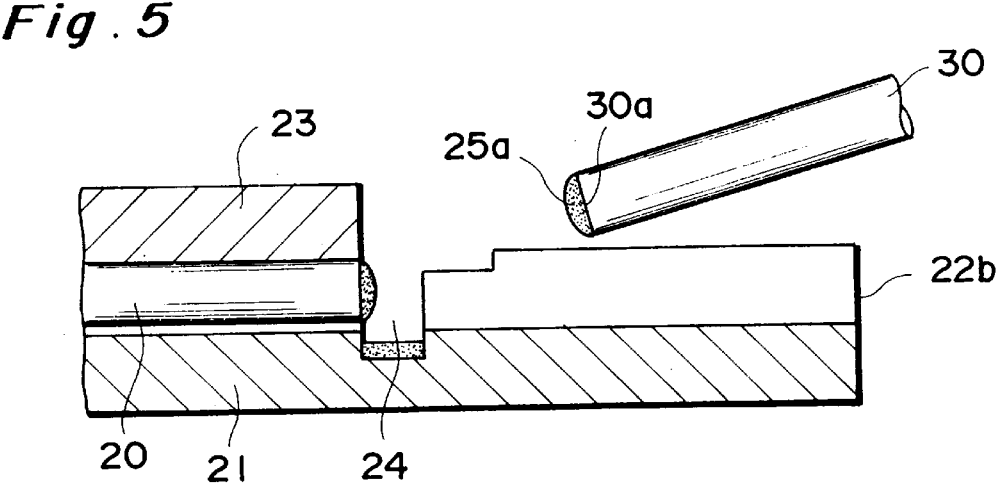

Since the gap between the first optical fiber 20 and the second optical fiber 30 is as small as about 20 μm, the drop amount of index matching agent can be small. The switching operation in the present embodiment will be described with reference to FIG. 3 to FIG. 6. After the index matching layer 25 is formed as shown in FIG. 3, the swing portion 42 shown in FIG. 2 is rotated in the direction of arrow B, thereby moving the second movable arm 33 upward. This results in lifting the second optical fibers 30 while moving them back away from the coupling part, as shown in FIG. 4 and FIG. 5. Connection with the first optical fibers 20 is released in this way. At this time the index matching agent adhering to the end faces of the second optical fibers 30 is kept by the surface tension of index matching agent, thus forming the liquid layer 25a on the end faces.

Figure 6:
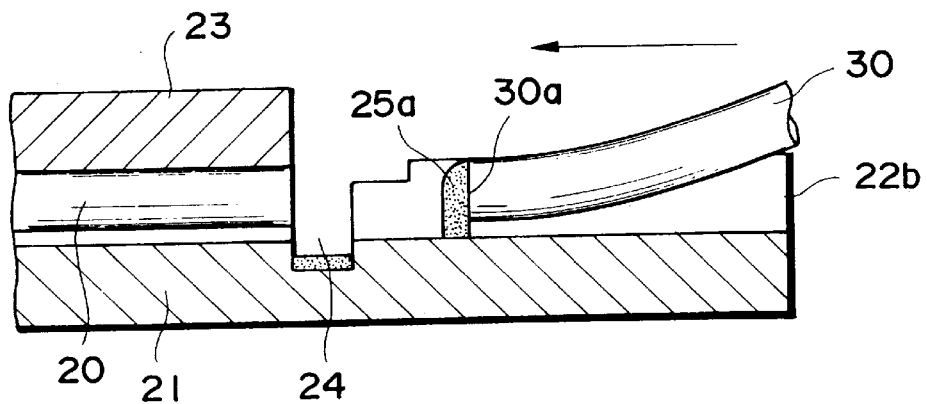

The movable arm 31 (see FIG. 1 and FIG. 2) is then driven with keeping this liquid layer 25a to move the second optical fibers 30 in the X-direction up to immediately above introducing grooves 22b on extension lines of fixing grooves 22a in which other first optical fibers 20 being desired coupling partners are located. After this, the swing portion 42 shown in FIG. 2 is rotated in the direction of arrow A, thereby moving the second movable arm 33 downward. This results in urging the second optical fibers 30 against the introducing grooves 22b and moving the tip portions thereof forward to the first optical fibers 20, as shown in FIG. 6. Then the second optical fibers 30 are again optically coupled with the first optical fibers 20 as shown in FIG. 3. At this time the gap between the first optical fiber 20 and the second optical fiber 30 is filled with the index matching agent kept on the end face of the second optical fiber 30. Therefore, there is no need to replenish the gap with the index matching agent every switching of optical connection between the first optical fiber 20 and the second optical fiber 30. Further, the index matching agent is lost mostly by evaporation, but an amount of evaporation is very small. Specifically, even in the case wherein the optical switch 1 is operated continuously for ten years, the consumption amount of the index matching agent is just about 50 cc.

As described above, the drive of the supply pump 63 is controlled by the optimum drop controller 67 and over drop controller 68. Specifically, the optimum drop controller 67 monitors signals indicating the optical transmission efficiency from the photodetector 70 and automatically drives the supply pump 63 with detection of a drop in the optical transmission efficiency. This drive of supply pump 63 causes the index matching agent to be dropped by a small amount from the drop nozzle, whereby the gap between the first optical fiber 20 and the second optical fiber 30 is replenished with a necessary amount of the index matching agent. The optimum drop controller 67 may be arranged so as to regularly replenish the gap with the index matching agent without monitoring the signals of optical transmission efficiency. For example, by employing such an arrangement that the gap is replenished with a drop or so of the index matching agent every other day, the gap between the first optical fiber 20 and the second optical fiber 30 is kept as always filled with the index matching agent.

The over drop controller 68 is arranged in such a way that when dust adheres to the gap between the first optical fiber 20 and the second optical fiber 30, the operator turns the switch 68a on to start the drive of supply pump 63. This drive of supply pump 63 causes a lot (approximately 10 cc) of the index matching agent to be dropped from the drop nozzle, whereby the lot of index matching agent is made to flow into the gap between the first optical fiber 20 and the second optical fiber 30. This results in washing the dust in the gap between the first optical fiber 20 and the second optical fiber 30 away and draining it through the matching agent drain groove 24 to the outside of the optical fiber arraying member 21. The gap between the first optical fiber 20 and the second optical fiber 30 can be cleaned easily in this way and the optical characteristics of the optical switch 1 can be always kept in good order.

This over drop controller 68 may be arranged in such a manner that the output signals from the photodetector 70 described previously are monitored and that only if the optical transmission efficiency is not improved by the operation of the optimum drop controller 67 the supply pump 63 is driven as making a judgment of mixture of foreign matter. Alternatively, cleaning may be carried out regularly without monitoring the output from the photodetector 70.

(Second Embodiment)

Figure 7:
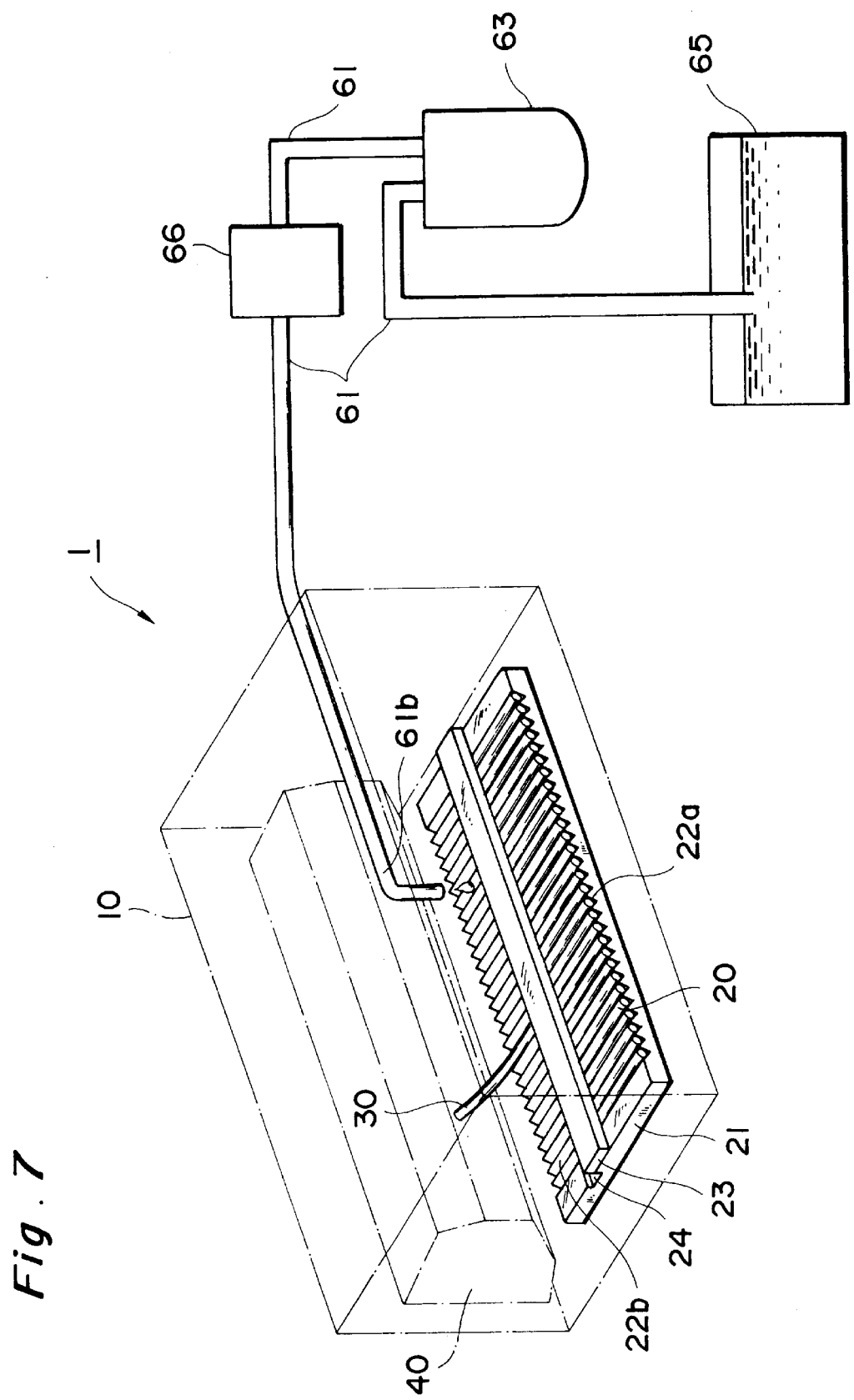
FIG. 7 is a cross-sectional, perspective view to show an optical switch as a second embodiment of the present invention.
Figure 8:
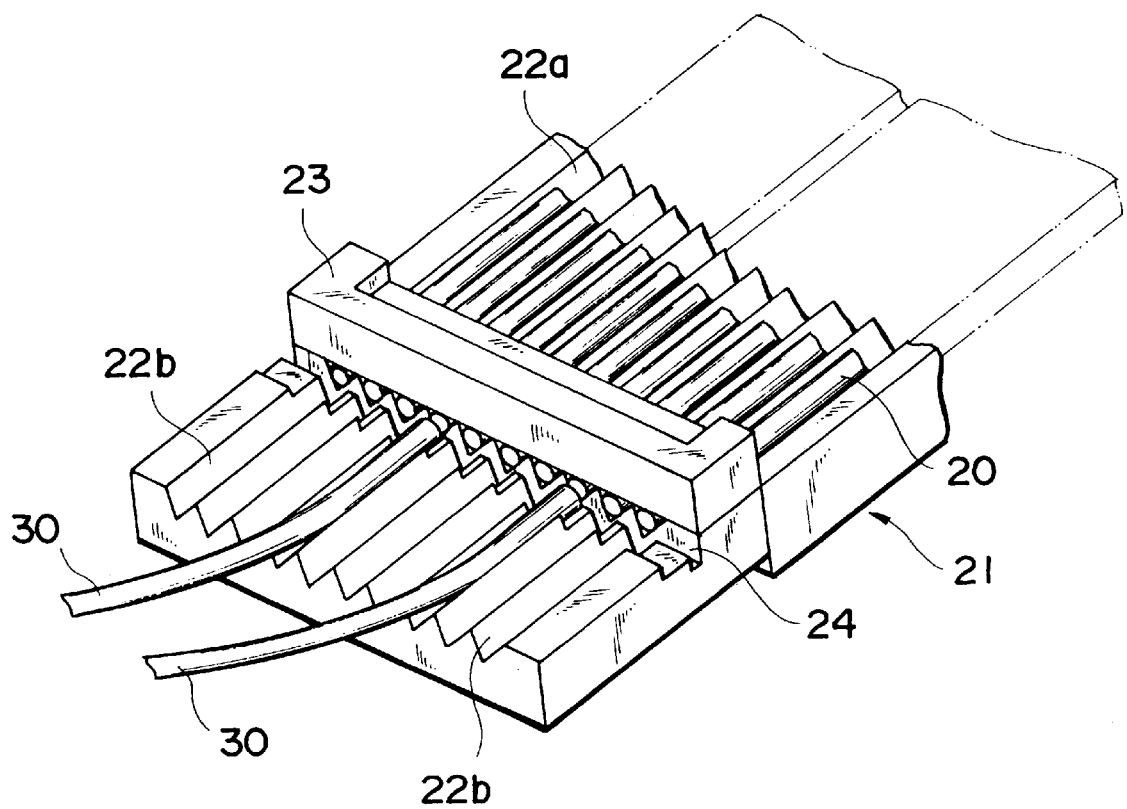
FIG. 8 is a detailed, perspective view of the connecting member of the optical switch shown in FIG. 7.

FIG. 7 is a schematic, explanatory drawing of the second embodiment of the present invention. FIG. 8 is an enlarged, perspective view of the connecting member of the second embodiment and FIG. 9 is a longitudinal, cross-sectional view thereof.

Figure 9:
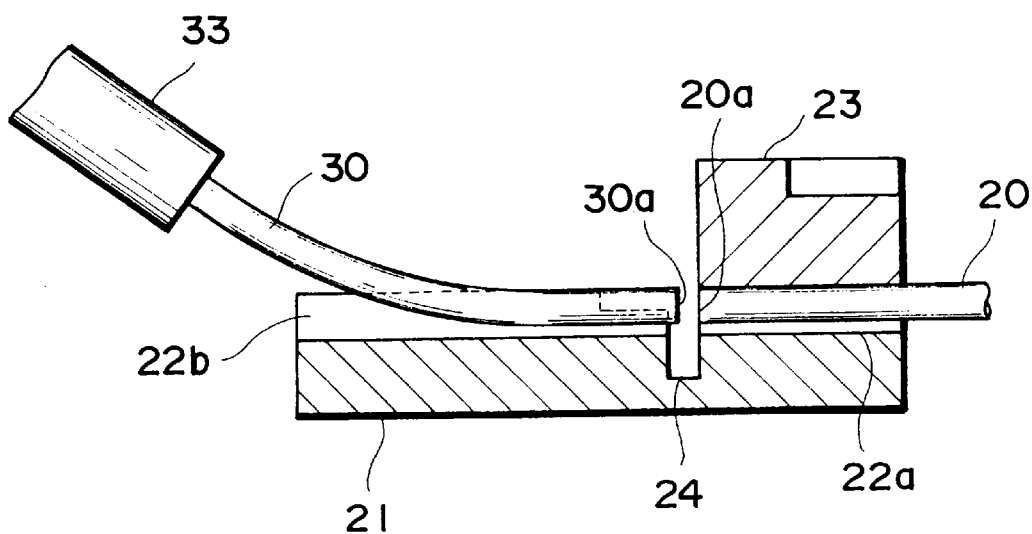
FIG. 9 is a cross-sectional view to show an optically coupled state between the first optical fiber and the second optical fiber in the optical switch shown in FIG. 7.

Reference is made to FIG. 7 to FIG. 9. A difference from the first embodiment resides in that drop nozzle 61b for dropping the index matching agent into the drain groove 24 is provided above the matching agent drain groove 24 of the optical fiber arraying member 21. The other structure is basically the same as in the first embodiment shown in FIG. 1 to FIG. 3.

The operation of this apparatus will be described referring to FIG. 7 to FIG. 13. FIG. 10 to FIG. 13 are drawings to show relations between the first optical fiber 20 and the second optical fiber 30 during the switching operation. FIG. 8 shows two second optical fibers 30, but the following description will be given as to a case in which only one of them is moved. It is also possible to move two or more second optical fibers 30 independently, and the operation thereof is according to the following description.

Figure 10:
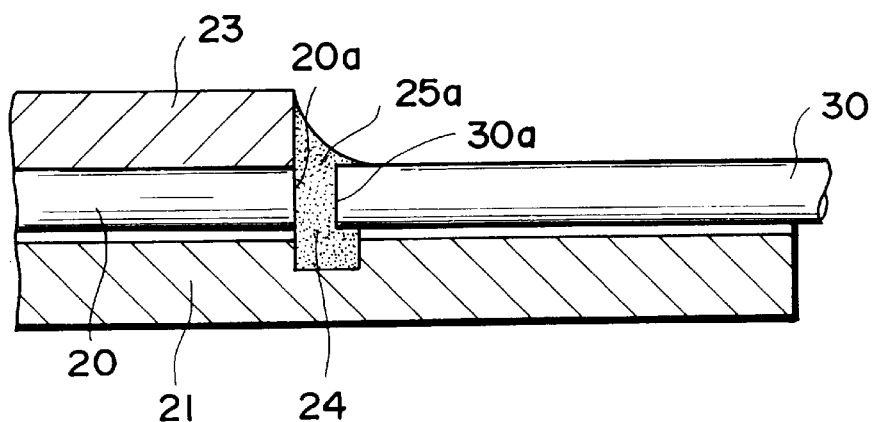
FIG. 10 to FIG. 13 are cross-sectional views for explaining positional relations between the first optical fiber and the second optical fiber upon switching of the optical switch shown in FIG. 7.

In the apparatus shown in FIG. 7 to FIG. 9 liquid droplets of the matching agent are first dropped by a predetermined amount from the drop nozzle 61b. The liquid droplets dropped run along the side wall of cover plate 23 to fill the inside of drain groove 24. This results in forming the matching layer 25a in the gap between the end face 20a of the first optical fiber 20 and the end face 30a of the second optical fiber 30 connected by capillarity, as shown in FIG. 10. The matching agent also wets the end faces 20a of the other, non-connected, first optical fibers 20 not facing the second optical fiber 30.

Figure 11:
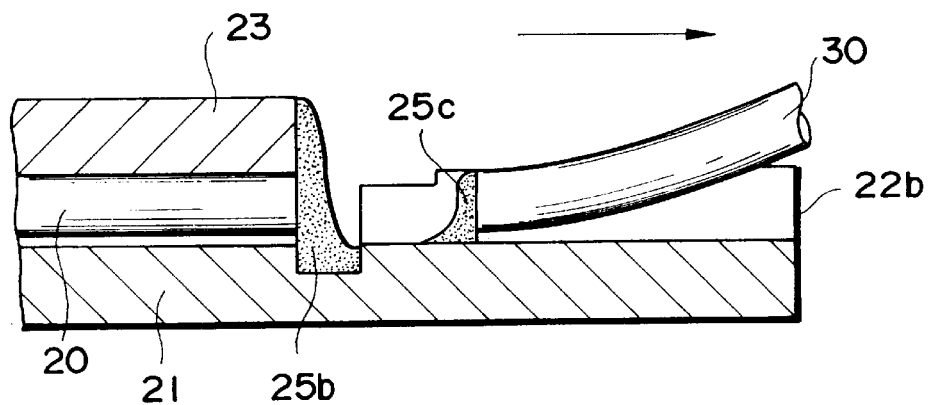

After this state is achieved, the switching operation-of the optical switch is carried out. First, the second movable arm 33 for holding the second optical fiber 30 shown in FIG. 9 is moved upward (this operation is the same as in the first embodiment described above). As the second movable arm 33 moves up, the second optical fiber 30 held by this second movable arm 33 also moves upward. The second optical fiber 30 is located in the introducing groove 22b so that the tip thereof is urged against the V-groove surface of the introducing groove 22b on the optical fiber arraying member 21 before the operation, as shown in FIG. 9. With the rise of the second movable arm 33, the end face 30a of the second optical fiber 30 is thus separated from the end face 20a of the first optical fiber 20 on the fixed side, as shown in FIG. 11. On this occasion, the matching layer 25a having been formed in the gap is divided into liquid layers 25b, 25c on the respective end faces of the first and second optical fibers 20, 30.

Figure 12:
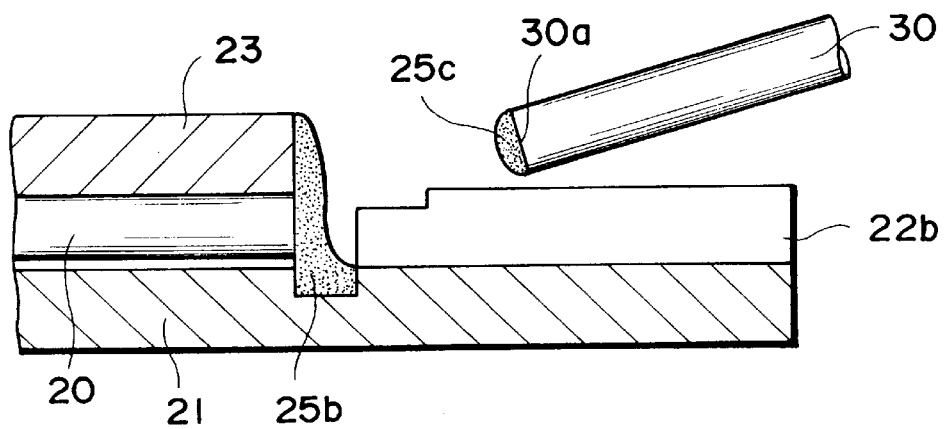

With further raising the second movable arm 33, the second optical fiber 30 is separated completely from the introducing groove 22b, as shown in FIG. 12. The second movable arm 33 is moved in this state along the longitudinal direction of drain groove 24 and then is stopped immediately above another introducing groove 22b opposite to the first optical fiber 20 to be connected.

Figure 13:
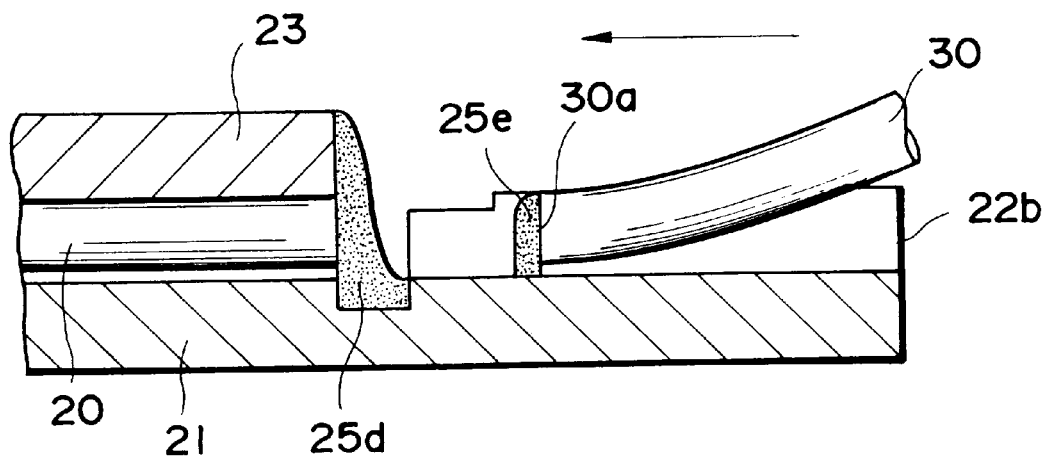

Then the second movable arm 33 is lowered again, so that the second optical fiber 30 comes to contact the V-groove surface of the introducing groove 22b at the tip, as shown in FIG. 13. With further lowering the second movable arm 33, the end face 30a of the second optical fiber 30 advances toward the end face 20a of the first optical fiber 20. Then the liquid layers 25d, 25e of the matching agent formed on the both end faces are incorporated finally to again form the matching layer 25a as shown in FIG. 10, thus optically connecting the both optical fibers 20, 30 with each other.

The inventor made a prototype of the optical switch of the present embodiment and conducted a test to carry out continuous operation of the switch while performing one switching operation per day and supplying two droplets of the index matching agent per day. The result of the test confirmed that the desired performance was maintained over one year without increase in splicing loss.

In order to check influence of mixture of foreign matter, a further operation test, similar to the above test, was conducted under such a condition that 0.01 g of powder of each of silicon, which was a material for the substrate, a photo-curable epoxy resin, which was a material for the covering of optical fiber, and stainless steel, which was a material for the driving mechanism, was placed on the cover plate 23 to be mixed with the index matching agent. The result of the test confirmed that no increase was observed in splicing loss due to the foreign matter.

The reason is considered to be that in the present invention the foreign matter itself is unlikely to move and adheres to the connecting member 21, because the causative force for keeping the matching agent adhering to the matching layer 25 of the optical fiber coupling part is based on the capillarity, i.e., the adhering force between the liquid and the surface or the like.

If the foreign matter adheres, the adhering foreign matter can be washed away by supplying the index matching agent by an amount over the consumption amount due to evaporation or the like. Further, the matching agent with degraded characteristics due to secular deterioration or the like can also be replaced by the same method.

The consumption amount due to evaporation of the index matching agent is 0.05 cc or less per day, and an amount necessary for 10-year operation is only 50 cc. There is also such an advantage that the amount of use of the matching agent is small in comparison with the conventional liquid immersion type optical switches necessitating a lot of matching agent and necessitating replacement of the total amount of matching agent with mixture of foreign matter.

A preferred drop position of the matching agent 25 is higher than the gap of the coupling part, but the matching agent 25 may be fed at a position lower than the gap or directly into the drain groove 24.

(Other Embodiments)

Without having to be limited to the above two embodiments, the present invention can also be modified, for example, as described below, within the scope not departing from the spirit and essence of the present invention.

(1) The above first embodiment was arranged so that the base 12 was moved to select the first optical fiber 20 to be optically coupled with the second optical fiber 30, but the optical fiber arraying member 21 may be arranged to move so as to select the first optical fiber 20.

(2) The above first embodiment was arranged so that the drop nozzle 61 was fixed to the movable arm driving mechanism 40, but it may be fixed so as to be directed toward the first optical fiber at an arbitrary position. In this case, the matching agent can be charged when the second optical fiber is coupled with the first optical fiber to which the drop nozzle is directed.

(3) The above first embodiment was arranged so that the drive of supply pump 63 was controlled by the two controllers, i.e., the optimum drop controller 67 and the over drop controller 68, but a single controller having the functions of those controllers may be provided to control the drive of supply pump.

(4) The above first embodiment was arranged so that the matching agent was supplied to the gap between the first optical fiber and the second optical fiber, but another permissible arrangement is such that the second optical fiber is moved to a position where the second optical fiber is not coupled with any first optical fiber, for example, to one end of the optical fiber arraying member 21 and the matching agent is dropped to the end face of the second optical fiber from the drop nozzle 61 directed to the end portion.

The optical switches according to the present invention can attain the following effects because of the above configurations.

Specifically, since the index matching agent is charged in the gap between the first optical fiber and the second optical fiber, reflection of signal light is suppressed on the end faces of the first optical fiber and second optical fiber, whereby the decrease of optical transmission efficiency can be suppressed between the first optical fiber and the second optical fiber. Since the index matching agent is charged only in the gap between the first optical fiber and the second optical fiber but the index matching agent does not wet the movable arm driving means, the foreign matter such as wear powder produced in the movable arm driving means is prevented from mixing into the index matching agent between the first optical fiber and the second optical fiber. This can prevent degradation of optical characteristics of optical switch due to the influence of foreign matter produced in the movable arm driving means. Further, since the amount of index matching agent used is small, the oil seal structure can be simple in the sealing case. This permits reduction in size and weight of apparatus. From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Applications No. 8-310863 (310863/1996) filed on Nov. 21, 1996, and 9-018272 (018272/1997) filed on Jan. 31, 1997 are hereby incorporated by reference.

What is claimed is:

1. An optical switch comprising:
    a first optical fiber group including a plurality of optical fibers, tip portions of which are aligned and fixed, said first optical fiber group being fixed on a substrate provided with a linear groove of a predetermined width so that the end face thereof is aligned with an edge of said groove; and
    a movable second optical fiber, an end face of which is disposed opposite to an end face of said first optical fiber group;
    a driving mechanism for moving said second optical fiber to a position where the second optical fiber is located opposite to an arbitrary first optical fiber in said first optical fiber group;
    a supplying mechanism for supplying an index matching agent to a groove between coupled end faces of said first optical fibers and said second optical fiber, the index matching agent being supplied through the groove by pouring a predetermined amount of the index matching agent into said groove;
    wherein said optical switch is arranged to selectively switch optical coupling between said arbitrary first optical fiber and said second optical fiber.

2. An optical switch according to claim 1, wherein said supplying mechanism further comprises a tank for reserving said index matching agent, a pump for taking a predetermined amount of the index matching agent out of said tank, a filter device for filtering the index matching agent taken out by said pump, and a supply tube for supplying the index matching agent thus filtered to said groove.

3. An optical switch according to claim 2, further comprising a control mechanism for controlling said supplying mechanism to supply a set amount of the index matching agent to said groove at a preset time.

4. An optical switch according to claim 2, further comprising photodetecting means for measuring a loss of transmitted light of said first optical fiber and second optical fiber optically coupled, and a control mechanism for, when the loss of transmitted light detected by said photodetecting means becomes over a predetermined quantity, controlling said supplying mechanism to supply the index matching agent to said groove before the loss of transmitted light becomes not more than the predetermined quantity.

5. An optical switch according to claim 2, wherein said supplying mechanism, based on an operation of an operator, supplys a set amount of the index matching agent to said groove.

6. An optical switch comprising:
    a first optical fiber group including a plurality of optical fibers, tip portions of which are aligned and fixed;
    a movable second optical fiber, an end face of which is disposed opposite to an end face of said first optical fiber group;
    a driving mechanism for moving said second optical fiber to a position where the second optical fiber is located opposite to an arbitrary first optical fiber in said first optical fiber group;
    a supplying mechanism for supplying an index matching agent to a gap between coupled end faces of said first optical fiber and second optical fiber, the supplying mechanism including drop charging means having a drop nozzle for drop-charging a liquid droplet of the index matching agent to the end face of said second optical fiber;
    wherein said optical switch is arranged to selectively switch optical coupling between said arbitrary first optical fiber and said second optical fiber.

7. An optical switch according to claim 6, wherein said supplying mechanism further comprises a tank for reserving said index matching agent, a pump for taking a predetermined amount of the index matching agent out of said tank, a filter device for filtering the index matching agent taken out by said pump, and a supply tube for supplying the index matching agent thus filtered to said drop nozzle.

8. An optical switch according to claim 6, wherein said first optical fiber group is fixed on a substrate in which a groove of a predetermined width is formed along an array direction of end faces of the optical fibers.

9. An optical switch according to claim 6, wherein said drop nozzle is fixed so as to be directed to an end face of a first optical fiber at a predetermined position in said first optical fiber group.

10. An optical switch according to claim 9, further comprising a control mechanism for, when said second optical fiber is optically coupled with the first optical fiber at said predetermined position, controlling said supplying mechanism to supply the index matching agent.

11. An optical switch according to claim 10, wherein when a preset time interval has elapsed after previous supply of the index matching agent, said control mechanism controls said supplying mechanism to supply a preset amount of the index matching agent.

12. An optical switch according to claim 10, further comprising photodetecting means for measuring a loss of transmitted light of said first optical fiber and second optical fiber optically coupled, wherein when the loss of transmitted light detected by said photodetecting means becomes over a predetermined quantity, said control mechanism controls said driving mechanism and said supplying mechanism to supply a preset amount of the index matching agent.

13. An optical switch according to claim 10, wherein said control mechanism supplies a preset amount of the index matching agent, based on an operation of an operator.

14. An optical switch according to claim 6, wherein said drop nozzle is driven together with said second optical fiber by said driving mechanism and is always directed to the end face of said second optical fiber.

15. An optical switch according to claim 14, further comprising a control mechanism for controlling said supplying mechanism to supply a set amount of the index matching agent to said drop nozzle at a preset time.

16. An optical switch according to claim 14, further comprising photodetecting means for measuring a loss of transmitted light of said first optical fiber and second optical fiber optically coupled, and a control mechanism for, when the loss of transmitted light detected by said photodetecting means becomes over a predetermined quantity, controlling said supplying mechanism to supply the index matching agent to said drop nozzle before the loss of transmitted light becomes not more than the predetermined quantity.

17. An optical switch according to claim 14, wherein said supplying mechanism supplies a preset amount of the index matching agent to said drop nozzle, based on an operation of an operator.

18. An optical switch comprising:

a first optical fiber group including a plurality of optical fibers, tip portions of which are aligned and fixed;

a movable second optical fiber, an end face of which is disposed opposite to an end face of said first optical fiber group;

a driving mechanism for moving said second optical fiber to a position where the second optical fiber is located opposite to an arbitrary first optical fiber in said first optical fiber group, a supplying mechanism for supplying an index matching agent to a gap region between coupled end faces of said first optical fiber and said second optical fiber, the gap region being disposed on an extension line in an array direction of said first optical fiber group;

photodetecting means for measuring a loss of transmitted light of said optically coupled first optical fiber and second optical fiber; and a control mechanism for controlling said driving mechanism to move a tip portion of said second optical fiber to said supplying mechanism, and when the loss of transmitted light detected by said photodetecting means is over a predetermined quantity, controlling said driving mechanism and said supplying mechanism to supply the index matching agent to the tip portion of said second optical fiber before the loss of transmitted light becomes not more than the predetermined quantity;

wherein said optical switch being arranged to selectively switch optical coupling between said arbitrary first optical fiber and said second optical fiber.

19. An optical switching method for moving an end face at a tip portion of a second optical fiber to a position where said second optical fiber is opposed to an end face at a tip portion of an arbitrary first optical fiber in a first optical fiber group including a plurality of optical fibers, tip portions of which are aligned and fixed, thereby selectively switching optical coupling between the first optical fiber and the second optical fiber, the method comprising:

pouring a predetermined amount of an index matching agent into a groove of a predetermined width provided along an array direction of end faces of the optical fibers in a substrate to which said first optical fiber group is fixed, thereby supplying the matching agent to said gap portion by utilizing surface tension of the index matching agent;

wherein switching is effected while a gap between coupled end faces of said first optical fiber and said second optical fiber is filled with the index matching agent having an index of refraction substantially equal to that of core portions of said both optical fibers.

20. An optical switching method according to claim 19, further comprising a step of moving said second optical fiber to a position on an extension line of an array direction of said first optical fiber group, and a step of adding said index matching agent to the end face thereof.

21. An optical switching method according to claim 19, further comprising a step of supplying a set amount of the index matching agent to said gap at a preset time.

22. An optical switching method according to claim 19, further comprising a step of supplying a set amount of the index matching agent to said gap, based on an operation of an operator.

23. An optical switching method for moving an end face at a tip portion of a second optical fiber to a position where said second optical fiber is opposed to an end face at a tip portion of an arbitrary first optical fiber in a first optical fiber group including a plurality of optical fibers, tip portions of which are aligned and fixed, thereby selectively switching optical coupling between the first optical fiber and the second optical fiber, the method comprising:

a charging step of using a drop nozzle, which is directed to an end face of a first optical fiber at a predetermined position in said first optical fiber group, to drop charge an index matching agent when said second optical fiber is optically coupled with said first optical fiber;

wherein said switching is effected while a gap between coupled end faces of said first optical fiber and said second optical fiber is filled with the index matching agent having an index of refraction substantially equal to that of core portions of said both optical fibers.

24. An optical switching method according to claim 23, further comprising a step of moving said second optical fiber to a position on an extension line of an array direction of said first optical fiber group, and a step of adding said index matching agent to the end face thereof.

25. An optical switching method according to claim 23, further comprising a step of supplying a set amount of the index matching agent to said gap at a preset time.

26. An optical switching method according to claim 23, further comprising a step of supplying a set amount of the index matching agent to said gap, based on an operation of an operator.

27. An optical switching method for moving an end face at a tip portion of a second optical fiber to a position where said second optical fiber is opposed to an end face at a tip portion of an arbitrary first optical fiber in a first optical fiber group comprised of a plurality of optical fibers, tip portions of which are aligned and fixed, thereby selectively switching optical coupling between the first optical fiber and the second optical fiber, the method comprising:

a charging step of using a drop nozzle, which is arranged to move with said second optical fiber and which is directed to the end face of said second optical fiber, to drop charge an index matching agent toward said end face;

wherein said switching is effected while a gap between coupled end faces of said first optical fiber and said second optical fiber is filled with the index matching agent having an index of refraction substantially equal to that of core portions of said both optical fibers.

28. An optical switching method according to claim 27, further comprising a step of moving said second optical fiber to a position on an extension line of an array direction of said first optical fiber group, and a step of adding said index matching agent to the end face thereof.

29. An optical switching method according to claim 27, further comprising a step of supplying a set amount of the index matching agent to said gap at a preset time.

30. An optical switching method according to claim 27, further comprising a step of supplying a set amount of the index matching agent to said gap, based on an operation of an operator.

31. An optical switching method for moving an end face at a tip portion of a second optical fiber to a position where said second optical fiber is opposed to an end face at a tip portion of an arbitrary first optical fiber in a first optical fiber group including a plurality of optical fibers, tip portions of which are aligned and fixed, thereby selectively switching optical coupling between the first optical fiber and the second optical fiber, the method comprising:

a step of measuring a loss of transmitted light of said optically coupled first and second optical fibers; and a step of, when the loss of transmitted light measured is over a predetermined quantity, supplying an index matching agent to said gap before the loss of transmitted light becomes not more than the predetermined quantity, wherein said switching is effected while a gap between coupled end faces of said first optical fiber and said second optical fiber is filled with the index matching agent having an index of refraction substantially equal to that of core portions of said both optical fibers.

* * * * *